United States Patent [19]

Lumbeck et al.

[11] 4,356,162

[45] Oct. 26, 1982

[54] METHOD OF OBTAINING ALKALI ALUMINATES FROM AQUEOUS SOLUTIONS

[75] Inventors: Peter Lumbeck; Hans Exner, both of Niederkassel, Fed. Rep. of Germany

[73] Assignee: Dynamit Nobel AG, Troisdorf, Fed. Rep. of Germany

[21] Appl. No.: 239,829

[22] Filed: Mar. 2, 1981

Related U.S. Application Data

[63] Continuation of Ser. No. 34,718, Apr. 30, 1979, abandoned.

[30] Foreign Application Priority Data

Apr. 29, 1978 [DE] Fed. Rep. of Germany ........ 2819004

[51] Int. Cl.$^3$ ............................................... C01F 7/04
[52] U.S. Cl. .................................... 423/600; 423/119; 34/10; 34/22
[58] Field of Search .................... 423/119, 600; 34/10, 34/22

[56] References Cited

U.S. PATENT DOCUMENTS 2,159,843  5/1939  Davies ................................ 423/600
2,345,134  3/1944  Lindsay et al. ..................... 423/600
3,324,567  9/1967  Franck .................................. 34/22
4,261,958  4/1981  Pevzner et al. ..................... 423/600

FOREIGN PATENT DOCUMENTS 2537969  3/1977  Fed. Rep. of Germany ...... 423/600
149411  10/1961  U.S.S.R. ............................. 423/600

OTHER PUBLICATIONS

Masters, "Spray Drying", Leonard Hill Books, London, 1972, pp. 465-475, 537, 538.
"Spray-Pro", Spray Dryer Process Corp., N.Y., N.Y., pp. 2-11.

Primary Examiner—Herbert T. Carter
Attorney, Agent, or Firm—Sprung, Horn, Kramer & Woods

[57] ABSTRACT

A process for obtaining solid alkali metal aluminates from an alkali metal aluminate aqueous solution by spray drying an alkali metal aluminate aqueous solution having an alkali metal oxide concentration of 1 to 6 mols per liter and an alkali metal oxide to alumina molar ratio of greater than 1. Also disclosed is an apparatus employed for effecting spray drying in which a spray drier of unidirectional flow is employed whose longitudinal axis is substantially horizontally disposed.

15 Claims, 1 Drawing Figure

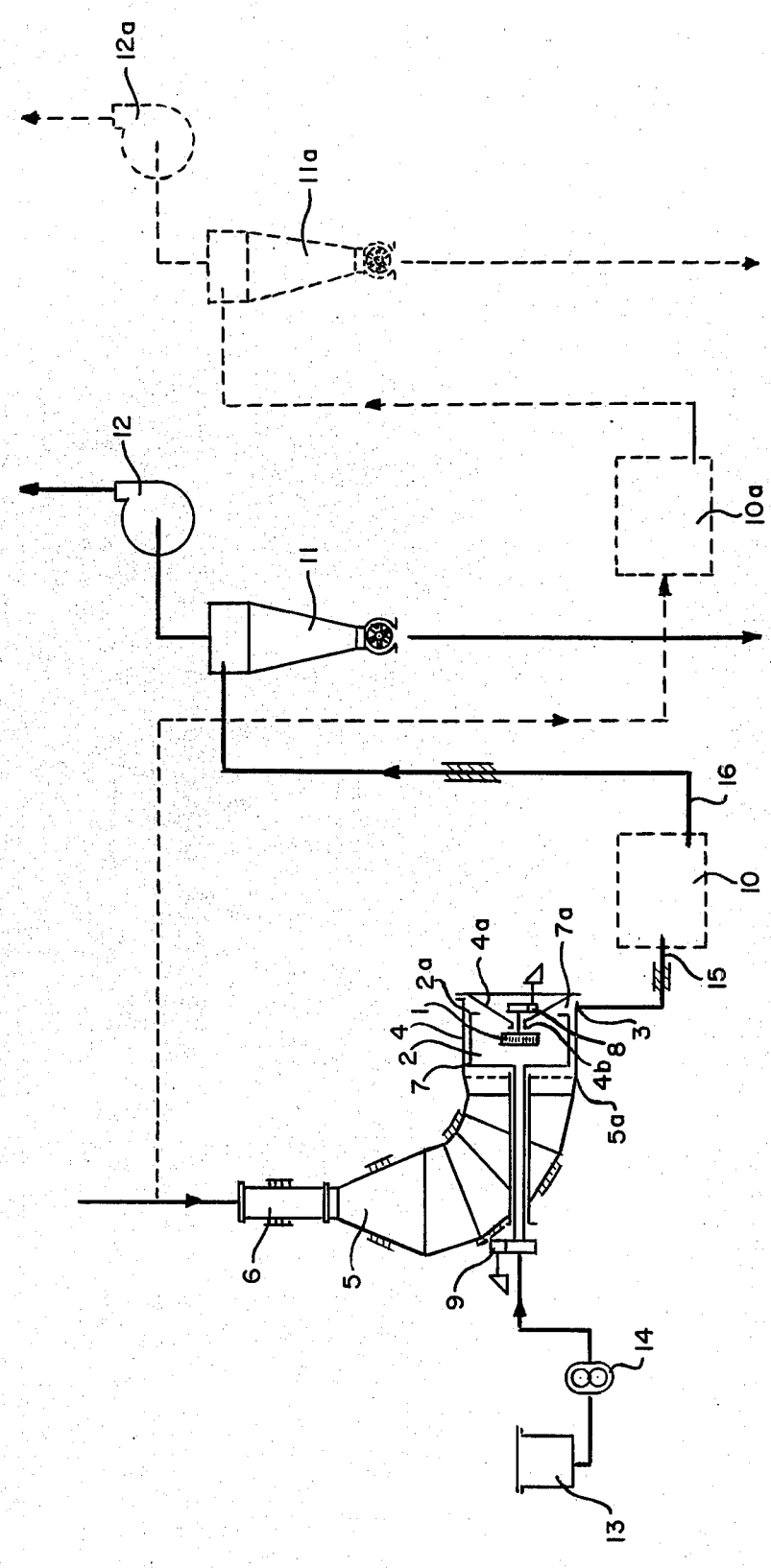

METHOD OF OBTAINING ALKALI ALUMINATES FROM AQUEOUS SOLUTIONS

This is a continuation of application Ser. No. 034,718 filed Apr. 30, 1979 and now abandoned.

BACKGROUND OF THE INVENTION

1. Field of the Invention

This invention relates to a method of preparing alkali metal aluminates from aqueous solutions by dehydration of the solutions by a drying process. More especially, this invention relates to a process for drying aqueous alkali metal aluminate solutions by spray drying to obtain particles of desired particle size in an easy and economical manner. This invention further relates to an apparatus for carrying out such process.

2. Discussion of the Prior Art

Alkali metal aluminates, especially sodium aluminate, have many uses, for instance as flocculants, for example in the purification of water, in paper manufacture, etc., and as aids in the construction materials industry in the production of fast-acting binders and the like.

In many cases, the user can obtain a stabilized aqueous alkali metal aluminate solution. For many purposes it is not only advantageous but essential to prepare dry, free-flowing alkali metal aluminates. These have to be able to dissolve easily and without residue to form aqueous, stabilized (against iron impurities) alkali metal aluminate solutions, they must be easy to feed and, if free-flowing secondary products have to be prepared, they must be easily miscible. For special applications, e.g., for the preparation of cements containing alkali metal aluminates, certain finenesses are required, i.e., the grain size distribution should be approximately the same as that of the cements.

In the methods known hitherto for the preparation of stabilized alkali metal aluminates in powder form having a residual moisture content of 5 percent and less, unstabilized, coarse-grained products are initially formed, which in further process steps are mixed with a stabilizer and then ground in several stages and graded.

For example, it is proposed in German Offenlegungsschrift No. 2,537,969 to subject aqueous alkali metal aluminate solutions to fluidized bed drying. Depending on the concentration and on the molar ratio of $Al_2O_3:Na_2O$, mixtures of dust and coarsely granular material are formed having grain sizes of from 0.5 to 8 millimeters. Without after-treatment, i.e., without stabilization, grinding and grading, this product is useless for most applications.

According to U.S. Pat. No. 2,345,134, stabilized sodium aluminate solutions are dried in the form of a thin film on a support. 200° C. is prescribed as the maximum temperature to avoid decomposition of the stabilizers. This process is unsuitable for industrial purposes because of the relatively low volume-time yield. It is disadvantageous, furthermore, that the solutions generally can be dehydrated down to only 20 percent by weight. These products are therefore not suitable for general use. Furthermore, this high moisture content results in higher transportation and storage costs.

Great Britain Pat. No. 711,615 describes in general the same results and provides for the subsequent admixture of a stabilizer for the stabilization of dry sodium aluminates having a residual moisture content of 5 percent and less.

The methods known hitherto for the production of stabilized alkali metal aluminates in powder form, therefore, require additional processing after drying, and consequently they operate uneconomically.

SUMMARY OF THE INVENTION

It is an object of this invention, therefore, to provide a method which does not suffer from the disadvantages of methods heretofore known, which can be performed in a simple and trouble-free manner by which one can dehydrate alkali metal aluminate solutions to obtain free-flowing solid alkali metal aluminates at a high volume/time yield. More especially, it is an object of this invention, therefore, to provide such a process which yields alkali metal aluminates in easy to handle form by a process which is controllable and adapted to any particular application. These and other objects of this invention will become apparent from the following description and claims.

The objects set forth above are provided, in accordance with this invention which comprises spray drying an alkali metal aluminate solution having an alkali metal oxide concentration of 1 to 6 mols per liter and a molar ratio of alkal metal oxide to alumina of greater than 1, preferably 1.1 to 1.8. Preferably, spray drying is effected of an alkali metal aluminate solution containing a spray drying adjuvant. Generally speaking, the concentration of alkali metal aluminate in the aqueous solution is between 10 and 60 percent by weight.

The subject matter of the invention, therefore, is a method of obtaining alkali metal aluminates from their aqueous solutions by dehydrating them by a drying process, this method being characterized by subjecting alkali metal aluminate solutions having an alkali oxide concentration of 1 to 6 mols per liter, preferably between 4 and 6 mols per liter, and a molar ratio of alkali metal oxide to $Al_2O_3$ greater than 1, preferably 1.1 to 1.8, and especially 1.1 to 1.4, to spray drying, the alkali metal aluminate solutions being preferably those containing a spray adjuvant in solution. The alkali metal oxides or alkali hydroxides involved are primarily those of sodium, although basically the oxides or hydroxides of the other alkali metals, such as potassium, rubidium, cesium, and lithium can also be used.

The spray drying is generally performed using gases or vapors as heat carriers at temperatures ranging from about 200° C. to 650° C., preferably from 230° C. to 600° C. Higher temperatures are basically also usable, if the material of the spray drying apparatus permits.

A unidirectional flow process is preferred for the spray drying, because it assures a gentle utilization of heat, and the stabilizer is not decomposed by it. At the same time the particles produced emerge together with the gases or vapors used as heat carriers, then further dried if desired, and then separated from the heat carrier by means known in themselves, such as sifters, for example.

The present invention is thus based on the innovative idea of subjecting aluminate droplets to flash drying in the open air.

This kind of drying makes it possible to use stabilized alkali metal aluminate solutions and therefore to produce, in a direct and continuous manner, a stabilized product having a residual moisture content of 5 weight percent or less.

It has surprisingly been found that by the addition of certain spray adjuvants to the solutions, one prevents incrustation and hence the clogging of the spray drying apparatus. An especially preferred procedure, therefore, comprises adding a spray drying adjuvant to the solutions.

Hexahydric alcohols, alone or in admixture, have proven to be particularly suitable spray adjuvants, examples being mannitol, dulcitol, iditol and sorbitol, especially sorbitol. These substances evidently have a surface tension reducing effect on the alkali metal aluminate solutions. Accordingly, other surface tension reducing agents might also be used, provided they do not have any other disadvantageous effect on the alkali metal aluminates to be produced. Examples of other possible spray adjuvants are organic polyhydroxy compounds, such as, for example, polyvalent alcohols, such as glycerol, glycol, sugar alcohols such as tetrahydric alcohols, pentahydric alcohols or monosaccharides or oligosaccharides or polysaccharides, such as invert sugar, cane sugar, starch, dextrins and the like, individually or in mixtures.

The spray adjuvants are generally added in the amount of 0.1 to 5 percent by weight, preferably in the amount of 0.1 to 1 weight percent, with respect to the solid content of the alkali metal aluminate solutions.

Another advantage of the method of the invention is that the grain sizes or grain size ranges can be controlled, so as to be adapted to a particular application. For example, it is possible to produce in a single process step relatively narrow grain size ranges in which, for example, the majority of the grains have a diameter of less than 0.5 mm, and the maximum grain size does not exceed 3 mm. Such grain sizes are suitable, for example, for the production of cements containing alkali metal aluminates.

The grain sizes or grain size ranges can be controlled, for example, by varying the nature and the amount of the spray adjuvant.

The degree of atomization and hence also the grain size of the dry product is furthermore controllable through the viscosity of the alkali metal aluminate solutions and the throughput, in relation to the effectiveness of the sprayer used. Depending on the concentration and temperature of the solution being fed to the sprayer, higher viscosities result in a coarser grain size than is obtained when solutions of lower viscosity are used. Generally, the viscosity of the alkali aluminate solution should be between 5 and 150 cP (resp. m Pa S), determined at 60° C.

With the method of the invention, therefore, one can, in a single step, obtain free-flowing, stabilized (against iron impurities) alkali metal aluminates having a residual moisture content of 5 percent or less, it being possible by varying the surface tension and the viscosity of the alkali metal aluminate solution to control the grain size range of the product.

Fundamentally, one can use aluminate solutions prepared in different ways. For example, aluminate solutions can be used which have been prepared by treating bauxite or some other such raw material with soda by the "pyrogenic" method and dissolving it in water. Also, an aluminate solution can be produced by Bayer's wet chemical process by concentrating by evaporation the alumina-containing raw material treated with caustic soda solution, followed by filtration and purification.

For the preparation of purer alkali metal aluminates it is desirable to treat an alumina trihydrate with alkali lye, such as the kind of alumina trihydrate which is produced, for example, in the Bayer process in the form of a washed salt which is still moist from the centrifugal extractor or filter or has been dried. This alumina trihydrate ($Al_2O_3.3H_2O$), as a moist salt, contains approximately 55 to 59 percent, by weight, of $Al_2O_3$. It is commercially available as a dried product having a content of 64 to 64.5 percent $Al_2O_3$ by weight.

In a preferred embodiment of the method of the invention, therefore, those aluminate solutions are used which have been obtained by treating alumina trihydrate ($Al_2O_3.3H_2O$) with aqueous NaOH at temperatures ranging from 110° C. to 140° C., preferably 125 to 135° C., the amounts of alumina trihydrate and the concentration of the aqueous NaOH being so coordinated that the resultant aluminate solution will have a concentration of alkali oxide of 1 to 6, preferably 4 to 6, mols per liter, and a molar ratio of $Na_2O$ to $Al_2O_3$ of 1.1 to 1.8, preferably 1.1 to 1.4.

For the treatment of the alumina trihydrate, it is advantageous to use aqueous alkali lyes such as those which are produced by the electrolysis of aqueous alkali salt solutions. These lyes have a concentration of 30 to 50 percent hydroxide by weight. If 38.5 weight percent caustic soda solution and dry alumina trihydrate (64–64.5 weight percent $Al_2O_3$) are used, the result will be a commercial aluminate solution containing 25 weight percent of $Al_2O_3$ and 19 weight percent of $Na_2O$ (molar ratio of $Na_2O:Al_2O_3=1.2$).

Substances which are already known are usable as stabilizers for the masking of iron impurities in alkali metal aluminates. Examples are organic polyhydroxyl compounds of low or high molecular weight, such as, for example, Rochelle salt, tartaric acid, gluconic acid, polyvalent phenols such as gallic acid, pyrogallic acid or soluble salts of these acids, e.g., the alkali or alkaline earth salts; polyvalent alcohols, e.g., glycerol, glycol; sugar alcohols, e.g., tetrahydric, pentahydric or hexahydric alcohols such as sorbitol, mannitol, dulcitol, or iditol; monosaccharides, oligosaccharides, polysaccharides, e.g., invert sugar, cane sugar; soluble saccharates, starch, dextrins and the like, individually or in mixture.

Hexahydric alcohols such as sorbitol, mannitol, dulcitol or iditol, which are obtained on a large technical scale by the catalytic hydrogenation of glucose, are especially preferred, especially sorbitol.

It is preferred to use as stabilizers the same agents which serve as spray adjuvants. The minimum amount depends on the amount of iron compounds to be masked. Generally, excess amounts are used. The amount will range in practice from about 0.1 to 5.0 weight percent, especially from 0.1 to 1 weight percent.

Basically, however, mixtures of at least one agent serving only as stabilizer and at least one substance serving as spray adjuvant can be added to the solutions that are to be dried. As a rule, incrustation or caking of the dry aluminates in the spray drying apparatus can be countered by the addition of at least 0.1 weight percent with respect to the solid content, in the case of sorbitol, for example. Depending on the effectiveness of other spray adjuvants, the required minimum amount may also be greater or lesser. Generally, the combined amount of stabilizer and spray adjuvant is between 0.1 and 5.0 weight percent of the alkali aluminate solution. This can be made up of a single substance, e.g., a monosaccharide, or a mixture of substances.

In the spray drying process, the material to be dried is sprayed in a finely divided manner into a stream of hot gas or vapor, the gas or vapor stream serving as a heat carrier. In the procedure of the invention, those gases or vapors are preferred as heat carriers which do not contaminate the product. Hot air or superheated steam are suitable, being obtained by the combustion of hydrogen, among other methods, for the production of particularly pure products. If the purity requirements are not so stringent, however, flue gases can also be used as heat carriers, such as those produced, for example, by the combustion of hydrocarbons (mixed with air).

For information on the principle of spraying or spray driers and unidirectional flow drying, see Lueger, Vol. 16 (1970), pp. 597 to 598 and p. 188, the disclosure of which is hereby incorporated herein by reference. Generally spray drying is effected, in accordance with the invention, at temperatures in the spray drier of 200° to 650° C. with the so-sprayed material remaining in the drier for 0.5 to 5 seconds after spraying. Desirably, spraying is effected for form particles of a size of 0.1 to 3.0 mm by spraying the alkali aluminate solution at a linear velocity of between 0.1 and 3 m/sec.

A unidirectional flow spray drier having a horizontal or approximately horizontal longitudinal axis has proven to be especially suitable for the process of the invention.

Additional subject matter of the invention, therefore, is an apparatus for the practice of the method of the invention, which apparatus comprises a spray drier in the form of a unidirectional flow spray drier having a longitudinal axis which is substantially horizontally disposed.

BRIEF DESCRIPTION OF DRAWING

The invention can be carried out with the use of the apparatus depicted in the accompanying drawing which is a side elevational view partly in section and partly diagrammatical.

The apparatus of the accompanying drawing can further be improved by a series of other vessels for further post-drying, these other vessels and the lines connecting them being shown in phantom.

DESCRIPTION OF SPECIFIC EMBODIMENT

An embodiment of a spray drier preferred in accordance with the invention is represented diagrammatically in the drawing, in which it is followed by a solids drier 10, a separator 11 and a blower 12, and preceded by a pump 14 and a reservoir 13 for the aluminate solution.

The spray drier is composed essentially of a stationary casing 4, which is connected at one end by the inlet duct 5 to the hot gas or hot steam generator and has a cover 4a at its other end, a cylindrical drum 2 provided with openings at the input end 7 and output end 7a and rotatable circumferentially within the casing 4, and a sprayer 1 disposed within the drum 2. Sprayer 1 comprises a spray disc which functions as an atomizer for the solutions fed therethrough.

The sprayer 1 comprises a sprayer disc which is rotatable circumferentially and mounted centrally on an axis disposed horizontally or approximately horizontally, which, for example, in the spraying of the aluminate solutions described above, is set in rotation by the drive means 8 at, for example, 3,000 to 12,000 rpm. The rotatory speed must be adapted to the chemical and physical characteristics of the lyes used, taking into consideration the desired grain size distribution in each case. The desired rotatory speed is obtained by conventional technical means, such as gears, gear belt pulleys or the like. The spray disc 1 consists of two discs disposed at a distance apart from one another in rotational symmetry, and joined together by stringers disposed preferably on the confronting faces of the discs in the outer marginal area thereof.

Basically, other known apparatus can be used for the spraying, such as, for example, nozzles, rotating hollow cylinders and the like. To obtain finely granular products of low residual moisture content, rotating elements or multi-substance nozzles are preferred, since they permit atomization to very small droplets. If multi-substance nozzles are used, fast-flowing gases having, for example, the same composition as the heat carriers, can be used as aids in the atomization of the liquid.

By means of a pump 14, the alkali aluminate solution is taken from the reservoir 13 and injected through the spray disc 1 into the drum 2 serving as the drying chamber. The drying chamber 2 is operated without pressure or at a slight pressure reduction. The pump 14 serves for controlling the rate of feed and to overcome the resistance to flow. Technically conventional, controllable displacement types of pump are used for the purpose, such as, for example, gear, piston, or membrane pumps or the like. The reservoir 13 is preferably a controlled-temperature, insulated tank, which can be provided with a stirrer, if desired.

The drum 2 is set in rotation through a drive 9, in a sense opposite to that of the spray disc 1. The back wall of the drum 2, which is fastened to the drive shaft 9, must have suitably large apertures 7 for the passage of the heat carrier. At the front end, the margins 2a are bent inward at a 90° angle. On the inner side of the cylindrical wall of drum 2 axially disposed ribs, each preferably in one solid piece, are provided for the transport of the product.

In some cases balls are present in the drum together with the material as aids in its transport. These balls can consist, for example, of a ceramic material, or of high-grade steel or other material which does not contaminate the aluminates. The diameter and mass of the balls are to be selected such that they will break up any caking on the drum wall, but will be unable to emerge at 2a from the drum. For example, steel balls of the diameter of 80 to 100 mm have proven beneficial. The turned-in margins 2a at the front end of the drum 2 prevent these balls from emerging together with the product.

The drum 2 is surrounded by a stationary drier casing 4. A conical, preferably threaded cover 4a with the spray disc drive on its outer face can serve advantageously as the closure. This conical cover is disposed such that its cross section tapers towards the input end of the drum 2. The cone must be situated, on the one hand, at a sufficient distance away from the turned-in margins 2a of the rotating drum 2 and the heat carrier (apertures 7a) to permit the unrestricted passage of the product and, on the other hand, the spray disc 1 should be mounted as close as possible to the cone end 4b, without touching same. The clearance between the flattened cone end 4b and the spray disc 1 can amount, for example, to from 5 mm to 20 mm.

The spray drier is set up horizontally. The drier casing 4 is connected at its rear by duct 5 to the hot gas or hot steam generator, which is not shown. The flow of the hot gases or vapors is desirably rectified and balanced by means, for example, of baffles or other such means 5a.

At the bottom end of the drier casing 4, the dried material is taken out at 3. The material, which is now free-flowing, can be removed together with the heat carrier, which by then has cooled down to 200° to 300° C. (the heat carrier had a temperature of, for example, more than 500° C. when it entered the drying chamber 2), and can be delivered to the separator 11. Depending on the evaporative capacity of the spray drier and its economical operation, one or more after-driers 10 can be provided, before the material passes into the separator 11. Generally, the material is subjected to after-drying at temperatures of 170° to 300° C. for 0.5 to 5 seconds before being separated.

For after-drying of this kind with short residence times, such as periods of a few seconds, with a high evaporative capacity, a vertically disposed drier constructed in the manner of a centrifugal air separator, and having a cylindrical top and a cylindrical bottom of smaller cross section forming one unit with the top, for example, is appropriate, the input pipe 15 discharging tangentially into the top and the output pipe 16 leading tangentially from the bottom section.

In the separator 11 is performed the separation of the hot gas or steam from the material. The heat carrier here has a temperature of 170° C., for example. At no point in the entire apparatus must the temperature drop to or fall below the dew point of the moisture-laden hot gas or steam.

If high final concentrations are required, one can subject the pre-dried product to still another after-drying operation in after-driers 10a, for the purpose of better utilization of the heat. For this purpose, a portion of the heat carrier is taken from the heat generator at a temperature of more than 500° C. and fed into the after-drier 10a. The separation of the hot gas or steam from the material is then performed in the separator 11a.

For the pneumatic transport of the material in the heat carrier, use is made of the blowers 12 and 12a. It is advantageous to install these blowers at the exhaust of the separators 11 and 11a.

In addition to the pneumatic transport, the blowers 12 and 12a can also play a decisive part in the efficiency of the drying apparatus. To achieve the desired flash drying, the temperature in the drying chamber 2 is to be as high as possible; for material reasons, however, it is limited, for example to 600° C. If a hot gas or steam producer of higher temperatures is used, supplemental gas or air can additionally be drawn into the mixing chamber 6 for the purpose of adjusting the temperature of the heat carrier at the rearward end 7 of the drier to the desired temperature of, for example, 580° C. to 600° C.

The temperature of the heat carrier at the output of the after-drier or after-driers 10 will depend on the dryness required in the product. This temperature of, for example, 200° to 300° C. is regulated by means of the rate of input of the pump 14 or by means of the quality and quantity of the lye in the reservoir 13.

Optimum utilization of energy can furthermore be accomplished if the waste heat of the exhaust gases or vapors is recycled to the mixing chamber 6 after leaving the blowers 12 or 12a, or, depending on the arrangement of these blowers, also after the separators 11 and 11a. For this purpose, an indirect heat exchanger, for example, can be provided for preheating the air ahead of the mixing chamber 6.

Both the spray drier used in accordance with the invention for the drying of alkali aluminates and the after-driers operate very effectively and gently, while requiring little space.

In order to more fully illustrate the nature of the invention and the manner of practicing the same, the following examples are presented.

In these examples, a spray drier was used in which the drum 2 had a diameter of 1.60 meters and a depth of approximately one meter. The spray disc had an outside diameter of 250 millimeters.

The after-drier 10 comprised a pair of after-driers constructed like centrifugal air separators such as those described above, connected in tandem, and having a maximum diameter of approximately one meter and a total height of 0.8 meter.

EXAMPLES

EXAMPLE 1

50 kilograms of dry alumina trihydrate (64.2 percent $Al_2O_3$) are treated with 58 liters of aqueous caustic soda solution (38.5 percent NaOH) at 130° C.; then one kilogram of sorbitol is added and the mixture is filtered.

The clear solution thus obtained contains:
  24.1 weight percent $Al_2O_3$
  18.4 weight percent $Na_2O$
  0.57 weight percent sorbitol.

This solution is fed at the rate of 380 kg/h at 40° C. to the spray drier shown in the drawing. The temperature of the heat carrier (steam superheated by the burning of hydrogen) was 580° C. The speed of the spray disc 1 was 9,000 rpm. The free-flowing aluminate emerging from the drum was passed through two after-driers in tandem and collected in the separator 11. The end product separated from the heat carrier had a content of $Al^{3+}$, determined by chemical analysis and reckoned as $Al_2O_3$, of 53.1 weight percent, and an $Na^+$ content, reckoned as $Na_2O$, of 40.3 weight percent. The molar ratio of $Na_2O:Al_2O_3$ was 1.25. The material contained 1.25 percent of sorbitol.

The residual moisture (free $H_2O$) amounted to 3 percent by weight.

The grain size distribution was as follows:
  0 percent over 3 mm
  1 percent between 3 and 2 mm
  20 percent between 2 and 0.5 mm
  29 percent between 0.5 and 0.15 mm, and
  50 percent under 0.15 mm.

The bulk density was 0.4 kilograms per liter.

EXAMPLE 2

50 kilograms of moist alumina trihydrate (57 percent $Al_2O_3$) are treated with 53.6 kg of aqueous soda lye (50 percent NaOH) at 130° C. and 0.2 kg of sorbitol is added. The slightly turbid solution obtained contains:
  27.5 weight percent $Al_2O_3$
  20.0 weight percent $Na_2O$
  0.2 weight percent sorbitol.

This solution is fed at a rate of 430 kg/h at 60° C. to spray driers. The temperature of the heat carrier (same as in Example 1) was 580° C. The speed of the spray disc 1 was 6,000 rpm. The rest of the processing was as in Example 1.

The end product had a content of $Al^{3+}$, determined by chemical analysis and reckoned as $Al_2O_3$, of 53.8 weight percent, and a content of $Na^+$, reckoned as $Na_2O$, of 39.2 weight percent. The molar ratio of $Na_2O:Al_2O_3$ was 1.2. The material contained 0.4 percent of sorbitol. The residual moisture (free $H_2O$) amounted to 4.7 weight percent.

The grain size distribution was as follows:

0 percent above 3 mm
10 percent between 2 and 3 mm
25 percent between 2 and 0.5 mm
35 percent between 0.5 and 0.15 mm, and
30 percent under 0.15 mm.

The bulk density was 0.9 kilograms per liter.

What is claimed is:

1. In a process for obtaining a solid alkali metal aluminate from an aqueous alkali metal aluminate solution by dehydrating the solution by a drying process, the improvement which comprises employing as the alkali metal aluminate solution a solution having an alkali metal oxide concentration of 1 to 6 mols per liter which solution has a mol ratio of alkali metal oxide to $Al_2O_3$ of greater than 1 and contains an organic polyhydroxyl compound in an amount of 0.1 to 5% by weight based upon the weight of the alkali aluminate solution and subjecting said solution to a spray drying process by contacting said solution with heat carrying gases or vapors at a temperature of 230° to 600° C. whereby the residual moisture content of the resultant solid alkali metal aluminate is 5 weight percent or less.

2. A process according to claim 1 wherein said alkali metal aluminate solution has a mol ratio of alkali metal oxide to $Al_2O_3$ of 1.1 to 1.8.

3. A process according to claim 1 wherein said alkali metal aluminate solution contains a stabilizer against iron impurities.

4. A process according to claim 1 wherein the alkali metal oxide concentration of said alkali metal aluminate solution is between 4 and 6 mols per liter and the molar ratio of alkali metal oxide to $Al_2O_3$ is 1.1 to 1.4.

5. A process according to claim 1 wherein said alkali metal aluminate solution is one prepared by treating alumina trihydrate ($Al_2O_3.3H_2O$) with aqueous sodium hydroxide at a temperature ranging from 110° to 140° C., the amount of alumina trihydrate and the amount in concentration of the aqueous sodium hydroxide being so coordinated that the aluminate solution that is formed has an alkali metal oxide concentration of 1 to 6 and a molar ratio of sodium oxide to alumina of 1.1 to 1.8.

6. A process according to claim 5 wherein said alkali metal aluminate solution is one prepared by treating alumina trihydrate with aqueous sodium hydroxide at a temperature in the range of 125° to 135° C., the amount of alumina trihydrate and the amount in concentration of the aqueous sodium hydroxide being so coordinated that the aluminate solution that is formed has an alkali metal oxide concentration of 4 to 6 mols per liter and a molar ratio of sodium oxide to alumina of 1.1 to 1.4.

7. A process according to claim 5 wherein the aqueous sodium hydroxide solution employed contains 30 to 50 weight percent sodium hydroxide.

8. A process according to claim 7 wherein said aqueous sodium hydroxide solution is a 38.5 weight percent aqueous sodium hydroxide solution.

9. A process according to claim 5 wherein the alumina trihydrate employed to form the alkali metal aluminate solution is an alumina trihydrate obtained by the Bayer process.

10. A process according to claim 1 wherein the spray drying is effected in a spray drier which is in the form of a unidirectional flow spray drier whose longitudinal axis is substantially horizontally disposed.

11. A process according to claim 1, wherein said organic polyhydroxyl compound is present in an amount of 0.1 to 1 weight percent.

12. A process according to claim 1, wherein said polyhydroxyl compound is Rochelle salt, tartaric acid, gluconic acid, polyvalent phenols, a soluble salt of a polyvalent phenolic acid, a polyvalent alcohol, a monosaccharide, oligosaccharides or a polysaccharide.

13. A process according to claim 1, wherein said organic polyhydroxyl compound is selected from the group consisting of Rochelle salt, tartaric acid, gluconic acid, gallic acid, pyrogallic acid, a soluble salt of gallic acid, a soluble salt of pyrogallic acid, glycerol, glycol and sugar alcohol.

14. A process according to claim 1, wherein said organic polyhydroxyl compound is selected from the group consisting of Rochelle salt, tartaric acid, gluconic acid, gallic acid, pyrogallic acid, an alkali or alkaline earth metal salt of gallic acid, an alkali or alkaline earth metal salt of pyrogallic acid, glycerol, a glycol, a tetrahydric alcohol, a pentahydric alcohol and a hexahydric alcohol.

15. A process according to claim 1, wherein said organic polyhydroxyl compound is selected from the group consisting of sorbitol, mannitol, dulcitol, iditol, a saccharate, starch and a dextrin.

* * * * *